United States Patent [19]

Esty

[11] E Re. 28,673

[45] Reissued Jan. 6, 1976

[54] METHOD OF PRESERVING PERISHABLE PRODUCTS

[75] Inventor: Joseph J. Esty, San Diego, Calif.

[73] Assignee: U. C. San Diego Foundation, La Jolla, Calif.

[22] Filed: Feb. 7, 1975

[21] Appl. No.: 547,965

Related U.S. Patent Documents

Reissue of:

[64] Patent No.: 3,715,860
Issued: Feb. 13, 1973
Appl. No.: 165,398
Filed: July 23, 1971

U.S. Applications:

[60] Continuation of Ser. No. 58,266, July 27, 1970, abandoned, which is a division of Ser. No. 645,968, June 14, 1967, Pat. No. 3,521,806.

[52] U.S. Cl. ..... 53/22 B; 53/7
[51] Int. Cl.[2] ..... B65B 31/04
[58] Field of Search ..... 53/7, 22 B

[56] References Cited

UNITED STATES PATENTS

| | | | |
|---|---|---|---|
| 2,242,686 | 5/1941 | Tirrell | 53/7 X |
| 2,814,382 | 11/1957 | Lassiter | 53/22 B X |
| 3,313,084 | 4/1967 | Forman | 53/22 B |

*Primary Examiner*—Travis S. McGehee
*Attorney, Agent, or Firm*—Harris, Kern, Wallen & Tinsley

[57] ABSTRACT

The method of packaging perishable products in a container and insuring preservation of the products while in the container, which method consists in permanently sealing the opening of the container after the product is packaged thereafter forcing an inert fluid to expel the air from the container through a port entry and exhaust, then sealing the port entry and exhaust while in the process of purging, thus trapping the inert fluid in the container.

2 Claims, 5 Drawing Figures

INVENTOR.
JOSEPH J. ESTY

BY

ATTORNEYS

INVENTOR.
JOSEPH J. ESTY

BY

ATTORNEYS

METHOD OF PRESERVING PERISHABLE PRODUCTS

Matter enclosed in heavy brackets [ ] appears in the original patent but forms no part of this reissue specification; matter printed in italics indicates the additions made by reissue.

CROSS REFERENCE TO RELATED APPLICATION

The present application is a continuation of S.N. 58,266 filed July 7, 1970 and now abandoned and which in turn is a division of the inventor's copending application Ser. No. 645,968, now Pat. No. 3,521,806, filed June 14, 1967.

BACKGROUND OF THE INVENTION (1) Field of the invention

The invention is directed to the method of packaging and preserving perishable products after being packaged by purging the package of air after the perishable product is packaged and substituting an inert fluid for the air.

(2) Description of the prior art

Applicant is not aware of prior art directed to the method herein disclosed.

SUMMARY OF THE INVENTION

The method comprises the placing of the perishable product through product inlet opening. Then that opening is sealed closed. Thereafter the air is purged from the package by forcing inert fluid through the package, the package having fluid inlet and outlet openings. During the purging, the fluid inlet and outlet openings are sealed to entrap the purging fluid.

Other features and the advantages of the present invention will be apparent from the following description, reference being had to the accompanying drawings wherein preferred embodiments of the invention are illustrated.

DESCRIPTION OF THE PREFERRED EMBODIMENTS

Figure 1:
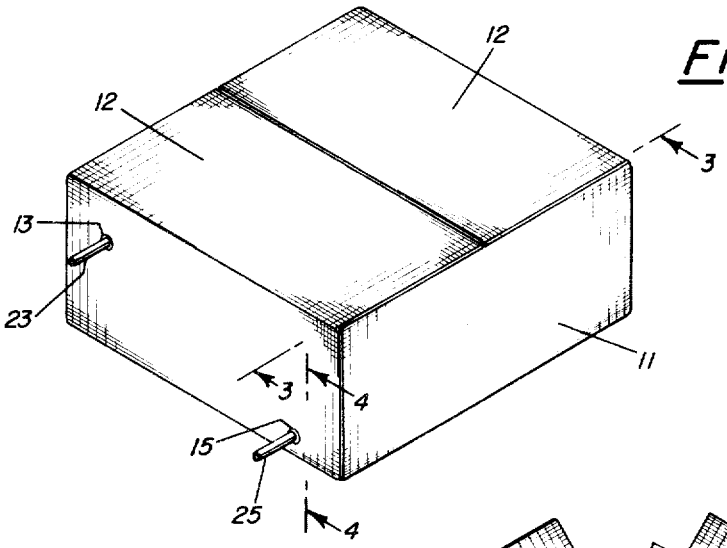
FIG. 1 is a perspective view of one embodiment of the package of this invention.

Referring more in detail to the drawings, and particularly to FIG. 1, the package includes an inherently stable carton 11. The carton 11 is preferably of the conventional cardboard crating type and includes closing flaps 12 extending upwardly from the sides thereof. The carton 11 includes an inlet opening 13 juxtaposed one side and the top and an outlet opening 15 juxtaposed the opposite side and the bottom on the same side of the carton.

A flexible, plastic [, i.e. impermeable] container 17 is disposed in the carton 11. The container 17 includes one side unsealed 18 forming an opening 19 for accepting perishable products such as fruits, vegetables, meats and flowers, apples 21, being illustrative. Plastic tubes 23 and 25 are affixed to the flexible plastic and extend from the container. The tubes 23 and 25 are alignable with and extend through the inlet and outlet openings, 13 and 14, respectively, and are supported by the walls forming the openings of the container.

Figure 5:
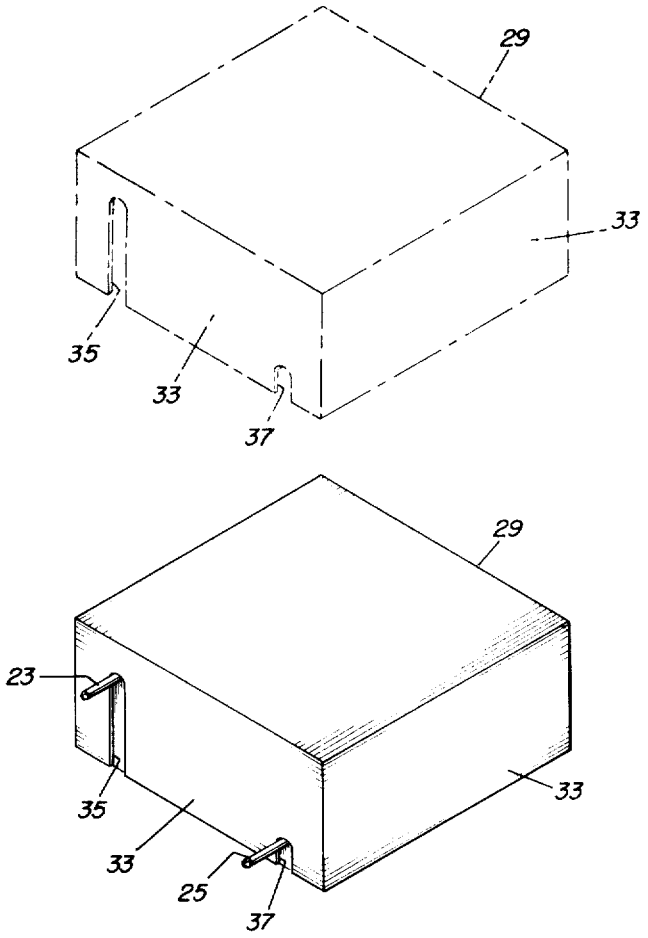
FIG. 5 is a perspective view of another embodiment of the package.

Referring now to the embodiment shown in FIG. 5, the carton 11 is of the same general configuration as that shown in FIG. 1, except there are no flaps 12. Rather, a cover 29 is provided for covering the container 17 receiving opening formed by the walls of the carton 11. The cover 29 is shown in broken lines, removed from the carton 11. The cover 29 includes walls 33 that surround the walls of the carton 11 and is adapted to be slidably extended thereover. One wall of the cover 29 includes slots 35 and 37 for accepting the tubes 23 and 25, respectively. Thus, the cover 29 can be slipped over the carton 11 and secured into covering position with the tubes 23 and 25 extending therethrough and accessible to be connected and sealed.

Figure 2:
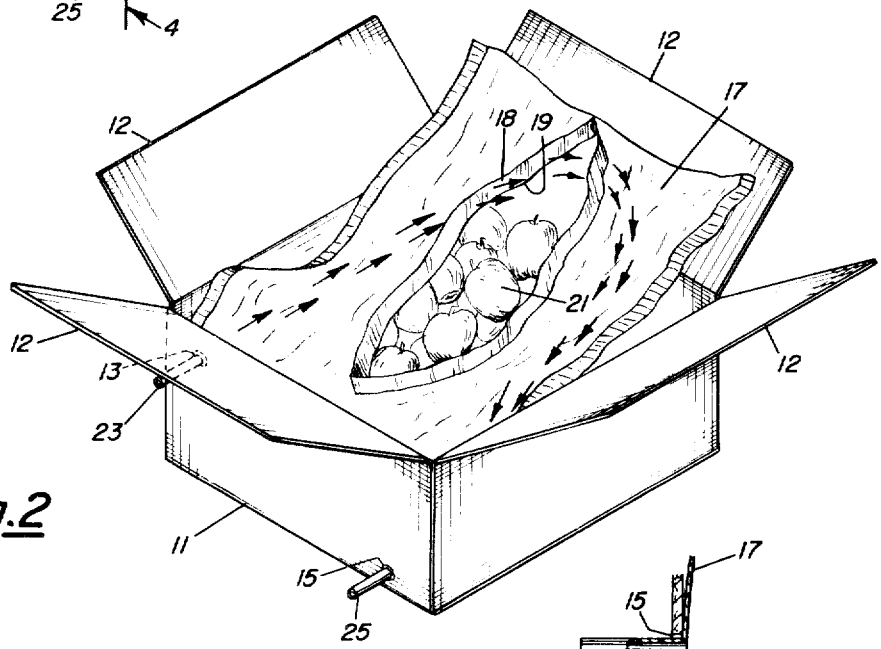
FIG. 2 is a perspective view of the package shown in FIG. 1, the stable carton being shown with the top open.
Figure 4:
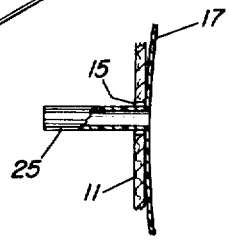
FIG. 4 is a fragmentary, sectional view of the package shown in FIG. 1, the view being taken along the line 4—4 of FIG. 1.
Figure 3:
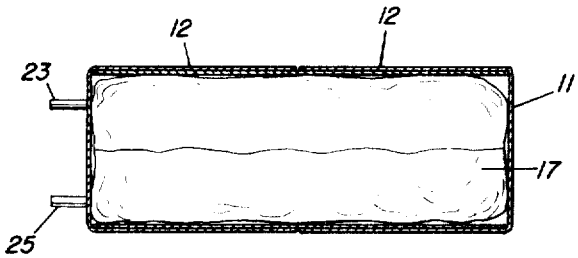
FIG. 3 is a sectional view of the package shown in FIG. 1, the view being taken along the line 3—3 of FIG. 1.

Shipping cartons 11 of the type depicted in FIG. 1, are generally supplied to the packager in a collapsed form. Thus, when it is desirable to package the products 21 for shipping or storage, the carton 11 is erected as shown in FIG. 2. The container 17 is then placed in the carton through the top opening and the tubes 23 and 25 are extended through the inlet and outlet openings 13 and 15, respectively. The produce, herein shown at 21, is then inserted through the opening 19 in the container and the opening is sealed. In the embodiment shown in FIG. 1, the envelope 17 is plastic and the opening 19 is sealed by pressing the film 18, forming the opening 19, together with conventional heat sealing mechanism. The flaps of carton 12 are then closed and taped in a conventional manner.

Any suitable method can be employed for removing the air from the container and substituting an inert gas. I prefer to connect a hose (not shown) to a supply of inert gas, such as argon or nitrogen, and to the tube 23. The inert gas is then released into the container 17 through the tube 23 and the inert gas expels the air through the outlet tube 25.

It is noted that the inlet tube 23-outlet tube 25 arrangement depicted, effects a very effective flow pattern. The flow pattern is depicted in FIG. 2 by arrows. The incoming gas enters the container 17 from the front and is propelled generally along and parallel to the side nearest the inlet tube 23. When the gas reaches the back wall of the container 17, it is deflected inwardly from the side and passes generally along the back wall until it reaches the side nearest the outlet tube 25. The gas is again deflected and is directed back toward the front of the container 17 and will be forced downwardly to pass out the outlet tube 25. Thus, flow is assured throughout the container 17 and no air pockets will be left uncirculated when the purge is completed.

The inert gas purge is continued for a time sufficient to drive essentially all of the air out of the container 17. When the desired level of inert atmosphere is reached, approximately 99.8% the purge is discontinued and while the container 17 is still pressurized, the tubes 23 and 25 are sealed. Sealing is preferably effected by cutting of the plastic tubes 23 and 25 with hot scissors, thereby severing and sealing the tube simultaneously. Since both tubes 23 and 25 extend from the same side of the container 11, they are readily accessible to the worker during the packaging.

The remaining portions of the tubes 23 and 25 are then preferably tucked back into the carton 11. If desirable, the openings 13 and 15 may then be covered in any conventional manner. The packaged produce 21 is then ready for shipment and is maintained in an inert atmosphere. Spoilage and decaying of the produce is obviated since essentially all the oxygen has been purged from the container 17 and photosynthesis is suspended. Pressurization of the envelope 17 is preferred since if the oxygen were expelled and a vacuum left in the container, there would be greater danger of oxygen seepage into the container. The lack of oxygen will cause any animal life included in the container 17 to quickly suffocate and the produce 21 will be protected from insect damage.

The above described method is preferred since it is generally much more economical to force a purge through the container 17 to purge the air therefrom, rather than to evacuate the air by vacuum. However, if it were desirable to evacuate the air by pulling a vacuum, only one tube, as for instance 23, would be necessary. The air could be evacuated from the container 17 through the tube 23 and the container 17 could then be pressurized by pumping the inert gas in through the tube 23. The tube 23 would then be sealed in the manner described above.

Referring now to packaging the produce 21, in the package embodiment shown in FIG. 5, the same general procedure, as that first described, is followed, except that, rather than closing the flaps 12, the cover 29 is slid into position and secured, as by taping. The container 17 is then purged and the tubes 23 and 25 sealed as described above.

From the foregoing it will be apparent that the method herein described, provides simple, effective and economical means of packaging perishable produce, meats and flowers.

Having described my invention, I now claim:

1. Those steps in the method of preserving a perishable product in a container [formed of impermeable material] having a product opening, an inlet tube for conveying a purging fluid to the container, and an outlet tube for withdrawing air from the container, the steps in the method comprising:

(A) inserting the product into the container through the product opening;

(B) thereafter permanently sealing the product opening;

(C) thereafter purging the interior of the container by forcing an inert fluid into the container through said inlet tube and forcing air from the container through said outlet tube;

(D) placing the container in a carton having more stability than the container;

(E) extending the tubes to the exterior of the carton;

(F) thereafter, and while the container is still pressurized with inert fluid, permanently sealing the tubes closed.

2. The steps in the method as defined in claim 1, characterized in that the tubes are formed of plastic that, when cut with a hot scissor, is sealed closed; and further characterized in that the step of sealing the tubes closed is by severing the tubes with a hot scissor.

* * * * *